United States Patent [19]

De Gruijter

[11] Patent Number: 4,824,147
[45] Date of Patent: Apr. 25, 1989

[54] ELECTRICALLY INSULATED PIPE JOINT

[75] Inventor: Wilhelmus A. E. M. De Gruijter, Zwijndrecht, Belgium

[73] Assignee: Angli Holding B.V., Rotterdam, Netherlands

[21] Appl. No.: 51,954

[22] Filed: May 13, 1987

[30] Foreign Application Priority Data

May 14, 1986 [NL] Netherlands .......................... 8601210

[51] Int. Cl.$^4$ .............................................. A16L 21/00
[52] U.S. Cl. ........................................ 285/53; 285/55;
285/292; 285/328; 285/382; 174/85
[58] Field of Search ...................... 285/53, 54, 55, 382,
285/292, 328; 174/85

[56] References Cited

U.S. PATENT DOCUMENTS

| | | | |
|---|---|---|---|
| 1,035,212 | 8/1912 | McCarthy | 285/53 X |
| 1,170,920 | 2/1916 | McCarthy | 285/53 X |
| 1,231,202 | 6/1917 | Saylor | 285/53 X |
| 3,441,293 | 4/1969 | Bagnulo | 285/382 X |
| 3,503,632 | 3/1970 | Braun | 174/85 X |
| 3,871,687 | 3/1975 | Dolkree | 285/53 |

FOREIGN PATENT DOCUMENTS

| | | |
|---|---|---|
| 2258598 | 6/1974 | Fed. Rep. of Germany ........ 285/53 |
| 2113668 | 5/1978 | Fed. Rep. of Germany ........ 285/53 |
| 3606577 | 12/1986 | Fed. Rep. of Germany ........ 285/53 |
| 150895 | 6/1967 | Netherlands . |

OTHER PUBLICATIONS

Prochin & Leaflet, 4 pp. for Monolithic Insulating Joints.

Primary Examiner—Dave W. Arola
Attorney, Agent, or Firm—Michael J. Striker

[57] ABSTRACT

An electrically insulated pipe joint comprises first and second metal tubular parts each having a flange at one end. The first and second tubular parts are coupled by a metal coupling sleeve surrounding the flanges and narrowing behind the flanges. A metal ring is located between both flanges, the outer diameter of which is greater than that of both flanges and which has its inner periphery in contact with the coupling sleeve. At both sides of the metal ring an electrically insulating seal ring is disposed. Further, an electrical insulation is disposed between the coupling sleeve and the first and second tubular parts.

17 Claims, 1 Drawing Sheet

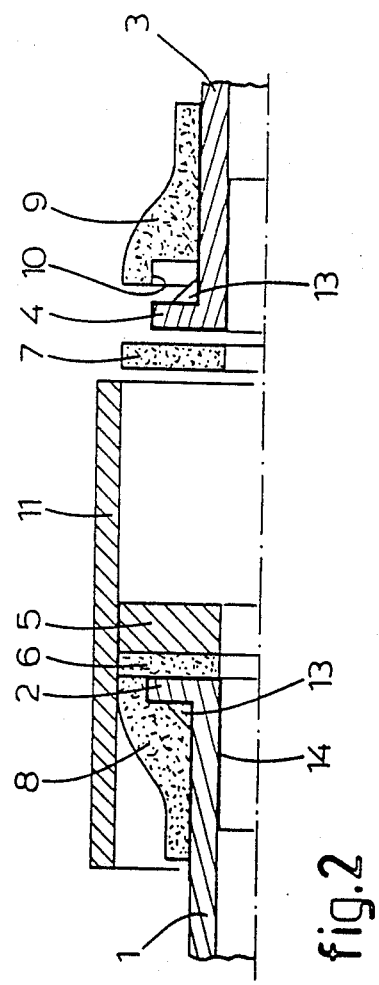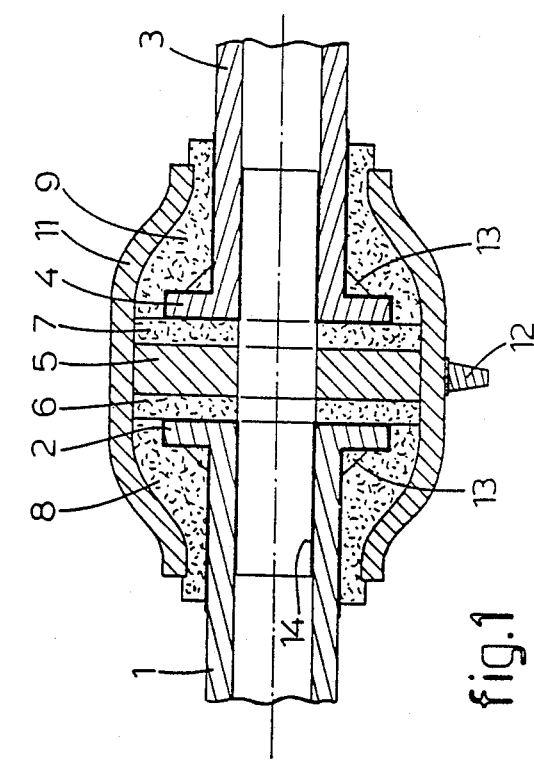

ELECTRICALLY INSULATED PIPE JOINT

BACKGROUND OF THE INVENTION

The invention relates to an electrically insulated pipe joint comprising a first metal tubular part having at one end a flange and a second metal tubular part which is coupled to the first tubular part by a metal coupling sleeve surrounding the flange and narrowing behind the flange, wherein between both tubular parts and between the coupling sleeve and the first tubular part an electrical insulation is disposed.

Such a pipe joint is known from Dutch patent application No. 6709100 now U.S. Pat. No. 150,895 which corresponds to U.S. Pat. No. 3,441,293. In this known pipe joint the coupling sleeve consists of a bell which is formed at the end of the second tubular part facing the end of the first tubular part. Between the front surface of the flange and the bottom of the bell an insulating seal ring is disposed, and at the rear side of the flange a conical insulating sleeve surrounding the first tubular part is disposed between the inner side of the bell and the first tubular part. Thereby the metal parts of both tubular parts at any location are separated from each other by a single insulation only so that a breaking down of the insulation when, for example, struck by lightning, renders the insulating pipe joint ineffective. When the outer surface of the bell were in contact with other metal or masonry structures, furthermore the pipe line which is electrically connected with the bell would be grounded through this contact.

SUMMARY OF THE INVENTION

The invention has the object of providing an insulated pipe joint of the above-mentioned kind which avoids the mentioned disadvantages in a simple but effective way.

For this purpose the pipe joint of the invention is characterized in that the second tubular part at the end facing the first tubular part also has a flange, wherein the coupling sleeve surrounds the flange of the second tubular part and narrows behind this flange, and between the coupling sleeve and the second tubular part also an electrical insulation is disposed, wherein between both flanges a metal ring is located, the outer diameter of which is greater than that of both flanges and which has its entire periphery in contact with the coupling sleeve, wherein at both sides of the metal ring an electrically insulating seal ring is disposed.

In this manner it is obtained that between both tubular parts there are always two resistances in series, regardless of the path followed by an eventual electrical discharge. When for example, one of the resistances is broken down struck by lightning, there always remains an insulation present between both tubular parts and the pipe joint still has the desired insulating effectiveness. Furthermore, the coupling sleeve in the pipe joint of the invention is fully insulated from both tubular parts so that the pipe lines coupled by the pipe joint cannot be grounded through the coupling sleeve. The coupling sleeve safeguards the insulation when struck by lightning or the like in that the discharge will take place from one of both tubular parts through the coupling sleeve to ground.

In keeping with this object, and others which will become apparent hereafter, one aspect of the invention resides, briefly stated, in an electrically insulated pipe joint comprising two metallic tubular elements each having an associated flange at a respective end, the flanges having front faces facing each other and each having an outer diameter greater than that of the tubular element associated with said flanges; means for coupling the two tubular elements together and including a metallic coupling sleeve surrounding the flanges and extending behind the flanges over the two tubular elements; means for insulating the coupling sleeve from the two tubular elements to prevent grounding through the coupling sleeve and including a first electrical insulation disposed between the coupling sleeve and each of the tubular elements; and means for establishing two resistances in series between the two tubular elements regardless of a path followed by an eventual electrical discharge due to lightning striking and including a metal ring disposed between the two tubular elements and a second electrical insulation disposed between the metal ring and each of said front faces of the flanges. The metal ring has an outer diameter greater than that of each of the flanges and has an end periphery in contact with the coupling sleeve.

Preferably, the metal coupling sleeve is provided with a projecting screw or the like for a grounded connection.

In a preferred embodiment of the invention each electrical insulation disposed between the coupling sleeve and a tubular part consists of an insulating sleeve disposed on the respective tubular part and made of rigid insulating material which is somewhat resilient under compression, wherein the outer diameter of each insulating sleeve at the end adjacent to the respective flange is equal to the outer diameter of the metal ring and decreases towards the other end to a diameter which is some millimeters greater than the outer diameter of the respective tubular part but smaller than the outer diameter of the respective flange, wherein the coupling sleeve over the entire axial length and periphery is forcefully squeezed on the metal ring and both insulating sleeves.

Hereby a monolithic non-dismountable insulated pipe joint is obtained, which is capable of high loadings.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

The invention will hereinafter be explained by way of the drawing in which an embodiment of the pipe joint of the invention is shown.

BRIEF DESCRIPTION OF THE DRAWINGS

FIG. 1 is an axial section of an embodiment of the electrically insulated pipe joint of the invention.

FIG. 2 is a partially shown axial section of another embodiment similar to the pipe joint of FIG. 1 but in a separated state.

DESCRIPTION OF THE PREFERRED EMBODIMENTS

FIGS. 1 and 2 show an electrically insulated pipe joint which comprises a first tubular part 1 having at one end a flange 2 and a tubular part 3 having at one end a flange 4. Between the flanges, 2, 4 facing each other a metal ring 5 is disposed, the outer diameter of which is greater than the outer diameter of the flanges 2, 4. At both sides of the metal ring 5 an insulating seal ring 6, 7 respectively, is positioned between the ring 5 and the associated flange 2, 4 respectively, which seal rings 6, 7 are made of a polymer, for example Teflon (tetrafluoroethylene), Makralon (thermoplastic amorphous material which is a compound between bisphenol A and carbon dioxide) or the like, which is rigid enough to withstand the occurring compression forces and at the same time may provide a hydraulic seal. The outer diameter of the seal rings 6, 7 is substantially equal to the outer diameter of the metal ring 5.

On each tubular part 1, 3 there is disposed an insulating sleeve 8, 9 respectively, which at the end adjacent to the fllange 2,4 respectively, has a recess 10 in which the flange 2, 4 respectively is received with a press fit, so that the said end of the insulating sleeve 8, 9 lies in one plane with the front surface of the respective flange 2, 4. The outer diameter of the insulating sleeve 8, 9 at the end adjacent to the flange 2, 4 respectively, is equal to the outer diameter of the metal ring 5 and at the other end is some millimeters greater than the outer diameter of the associated tubular parts 1, 3 respectively, but in any case smaller than the outer diameter of the flange 2, 4 respectively. The outer surface of the insulating sleeve 8, 9 tapers with an S-slope from the end of the greatest diameter to the end of the smallest diameter.

Both tubular parts 1, 3 are coupled together by a metal coupling sleeve 11, which surrounds all said components of the joint and which is forceably squeezed over its entire axial length and periphery on the outer surfaces of the metal ring 5, the seal rings 6 and 7 and the insulating sleeves 8 and 9 thereby a non dismountable joint is obtained, which can take high loadings, whereby the tubular parts 1, 3 can not go loose.

The metal coupling sleeve 11 is provided with a projecting screw or the like for connection to ground.

A particular important advantage of the disclosed pipe joint of the invention is that between the tubular parts 1 and 3 two electrical resistances are in series, and the metal coupling sleeve 11 is fully insulated from both tubular parts 1, 3. When one of the resistances becomes defective by breaking down or the like, there still remains an electrical insulation present between both tubular parts 1 and 3, so that the contemplated insulating effectiveness of the pipe joint is maintained. In the case of an electrical discharge, for example when one of both pipe lines coupled by the pipe joint is struck by lightning, the discharge will be conducted to ground from the respective tubular part 1 or 3 through the coupling sleeve 11.

On the outer surface of each tubular part 1, 3 at the flange 1, 4 respectively a number of radial projections 13 can be disposed, which may be triangular, wedge like or similar. These projections 13 upon mounting of the insulating sleeves 8 and 9 are pressed into the material thereof and thereby retain the insulating sleeves 8, 9.

At the ends having the flanges 2, 4 the tubular parts 1, 3 are provided with an insulating lining 14 which is disposed both on the inner and outer surface. The insulating lining 14 also may only be disposed on the inner surface. As an alternative, the insulating lining 14 may be replaced by a thin sleeve.

FIG. 2 shows a thin sleeve appendix 15 generating from an internal perimeter of the seal rings 6, 7. This appendix 15 replaces the insulating lining 14.

For improving the seal of the pipe joint both seal rings 6, 7 at both sides may be provided with a thin annular gasket 16. Furthermore, on the front surface of the flanges 2, 4 may be disposed one or more annular upstanding ringes 17. Also the metal ring 5 at both sides may be provided with similar annular upstanding ridges 18.

The invention is not limited to the previously enclosed embodiment, which may be modified in various manners within the scope of the invention.

It will be understood that each of the elements described above, or two or more together, may also find a useful application in other types of electrically insulated pipe joints differing from the types described above.

While the invention has been illustrated and described as embodied in electrically insulated pipe joints, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An electrically insulated pipe joint, comprising:
   two metallic tubular elements each having a respective end and an associated flange at said respective end, said flanges having front faces facing each other and each having an outer diameter greater than that of said tubular element associated with said flange;
   means for coupling said two tubular elements together and including a metallic coupling sleeve surrounding said flanges and extending behind said flanges over said two tubular elements;
   means for insulating said coupling sleeve from said two tubular elements to prevent grounding through said coupling sleeve and including a first electrical insulation disposed between said coupling sleeve and each of said tubular elements; and
   means for establishing two resistances in series between said two tubular elements regardless of a path followed by an eventual electrical discharge due to lightning striking and including a metal ring disposed between said two tubular elements and a second electrical insulation disposed between said metal ring and each of said front faces of said flanges, said metal ring having a circumferential surface with an outer diameter greater than that of each of said flanges and said circumferential surface being in contact with said coupling sleeve, said coupling sleeve having an inner periphery that is forceably squeezed only onto said first insulation and said circumferential surface of said metal ring.

2. The joint as defined in claim 1, wherein said second insulation is formed as two electrically insulated seal rings each arranged between a respective one of said flanges and said metal ring.

3. The joint as defined in claim 2, wherein said seal rings have an internal perimeter, at least one of said seal rings being formed with an appendix extending from said internal perimeter and serving as additional insulation.

4. The joint as defined in claim 1, wherein said coupling sleeve narrows in diameter behind each of said flanges.

5. The joint as defined in claim 1, wherein said first electrical insulation is formed as two insulating sleeves composed of rigid insulating material somewhat resilient under pressure, each of said two insulating sleeves also having a first end with an outer diameter equal to said outer diameter of said metal ring and a second end with an outer diameter smaller than that of a respective one of said flanges and larger than that of at least a portion of one of said associated tubular elements, each of said first ends being arranged adjacent to a respective one of said flanges, each of said insulating sleeves being disposed on a respective one of said associated tubular elements so as to narrow in diameter from said first end to said second end, said coupling sleeve having three portions constituting an entire axial length and said inner periphery of said coupling sleeve, one of said three portions being squeezed on said metal ring and the other two of said three portions each being squeezed on a respective one of said two insulating sleeves.

6. The joint as defined in claim 5, wherein said outer diameter of said second end of each of said insulating sleeves is formed a plurality of millimeters greater than that of said respective one tubular element.

7. The joint as defined in claim 5, wherein each of said first ends of said insulating sleeves have an annular recess into which said respective one of said flanges is press fitted, each of said first ends being disposed in one common plane with a respective one of said front faces of said flanges.

8. The joint as defined in claim 5, wherein each of said insulating sleeves has an outer surface tapering down nearly with an S-slope from said first end to said second end.

9. The joint as defined in claim 5, wherein said flanges each have an outer surface with a predetermined number of projections disposed thereon.

10. The joint as defined in claim 5, wherein each of said tubular elements has an outer surface with a corner junction between said respective end and said associated flange; and further comprising:
means for retaining said insulating sleeves and including projections each being pressed on said insulating sleeves, said projections being formed to extend outward at said corner junction.

11. The joint as defined in claim 1; further comprising:
means for connecting said coupling sleeve to a ground and including a screw projecting from said coupling sleeve.

12. The joint as defined in claim 1, wherein said front faces of said flanges each have at least one annular upstanding ridge.

13. The joint as defined in claim 1, wherein said metal ring has two sides each facing a respective one of said flanges, each said sides havingg at least one annular upstanding ridge.

14. The joint as defined in claim 1, wherein each of said seal rings has at least one side formed with an annular gasket.

15. The joint as defined in claim 14, wherein said annular gasket is formed relatively thin.

16. The joint as defined in claim 1, wherein each of said tubular elements has an inner surface; further comprising:
additional insulation lining said inner surface of said tubular elements.

17. The joint as defined in claim 1, wherein said coupling sleeve has an entire axial length, said inner periphery of said coupling sleeve being forceably squeezed over said entire axial length.

* * * * *